United States Patent [19]

Marti

[11] 4,219,923
[45] * Sep. 2, 1980

[54] WHEEL BRAKE ASSEMBLY

[76] Inventor: Milford F. Marti, 4001 Devon, Huntsville, Ala. 35802

[*] Notice: The portion of the term of this patent subsequent to Jan. 29, 1991, has been disclaimed.

[21] Appl. No.: 32,022

[22] Filed: Apr. 20, 1979

Related U.S. Application Data

[63] Continuation of Ser. No. 796,346, May 12, 1977, Pat. No. 4,150,736, which is a continuation of Ser. No. 638,594, Dec. 8, 1975, abandoned, which is a continuation of Ser. No. 444,736, Feb. 22, 1974, abandoned.

[51] Int. Cl.³ ............................................. B23P 11/00
[52] U.S. Cl. ......................................... 29/434; 29/469; 188/18 R; 188/329; 188/340; 192/75; 192/115; 228/182
[58] Field of Search ............... 188/325, 327, 328, 329, 188/330, 331, 332, 333, 334, 335, 340, 341, 18 R; 228/182; 192/75, 76, 115; 29/434, 469

[56] References Cited

U.S. PATENT DOCUMENTS

| | | | |
|---|---|---|---|
| 2,475,491 | 7/1949 | Goepfrich et al. | 188/340 X |
| 2,501,578 | 3/1950 | Pointer | 188/335 X |
| 2,525,550 | 10/1950 | Jewell | 188/335 |
| 2,609,892 | 9/1952 | Smith | 188/340 X |
| 2,828,834 | 4/1958 | Smith | 188/327 X |
| 3,618,716 | 11/1971 | Studdard et al. | 188/18 R X |
| 3,757,903 | 9/1973 | McLane | 188/332 X |
| 3,788,432 | 1/1974 | Marti | 188/332 X |

FOREIGN PATENT DOCUMENTS 1388321 12/1964 France ..................................... 188/325

Primary Examiner—George E. A. Halvosa
Attorney, Agent, or Firm—C. A. Phillips

[57] ABSTRACT

A wheel brake assembly in which the webs of brake shoes are held in a planar alignment between and supported by a pair of parallel-spaced interconnected supporting plates, in turn supported by an axle or spindle. A pair of brake contracting springs interconnect the brake shoes, and these springs are positioned with one spring being against the outer surface of each plate. An inner edge of each of the plates is circular and independently adapted to attach to an axle housing, whereby the brake assembly may be readily welded to an axle housing.

2 Claims, 16 Drawing Figures

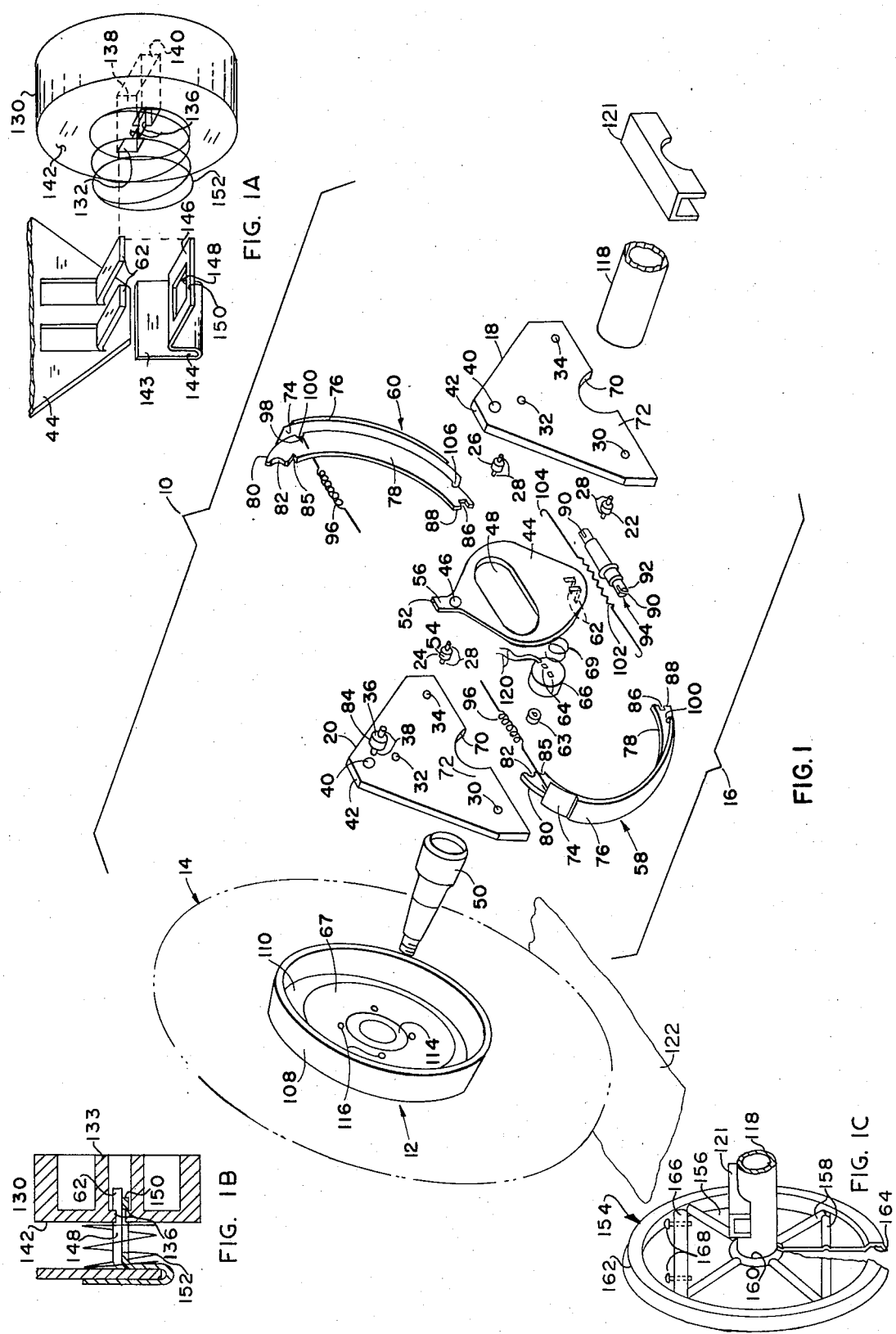

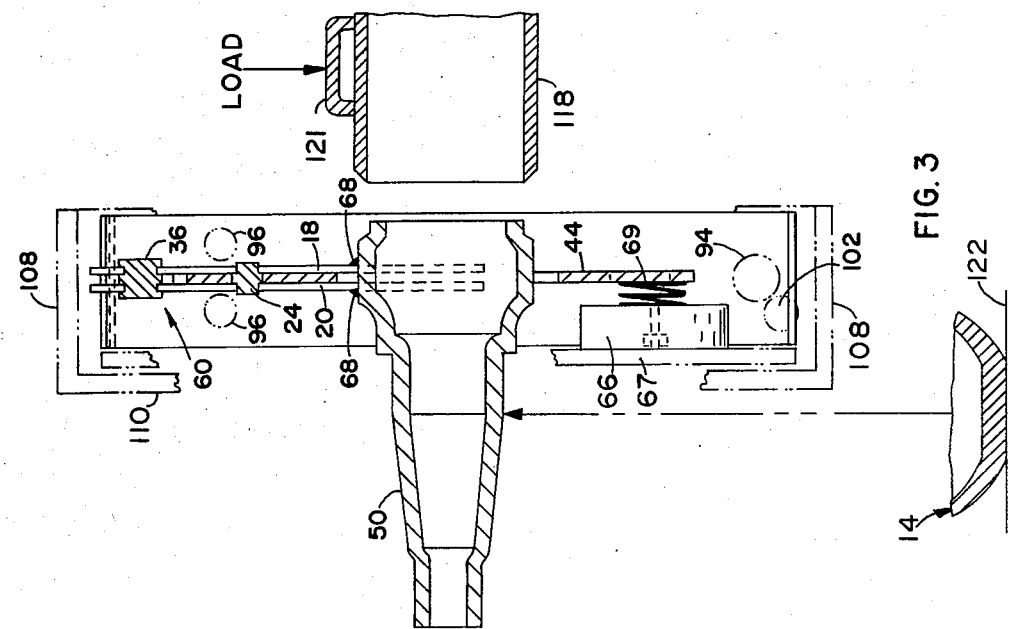
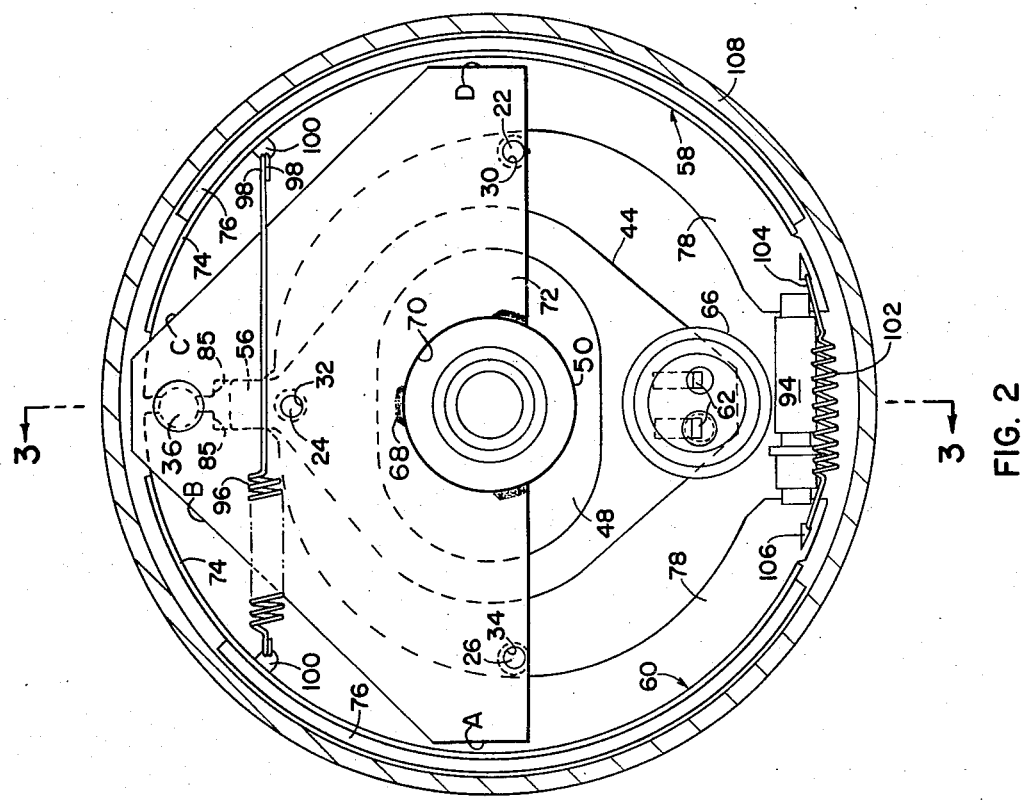

WHEEL BRAKE ASSEMBLY

This application is a continuation of application Ser. No. 796,346, filed May 12, 1977, and now U.S. Pat. No. 4,150,736, which is a continuation of application Ser. No. 638,594, filed Dec. 8, 1975, now abandoned, which is a continuation of application Ser. No. 444,736, filed Feb. 22, 1974, now abandoned, which was an application for the reissue of U.S. Pat. No. 3,788,432.

BACKGROUND OF THE INVENTION

Towed vehicles weighing more than certain state regulated weights are required to have brakes which may be operated from the cab of the towing vehicle. In general, such vehicles as mobile homes, recreational trailers, and certain other towed vehicles such as boat trailers employ electrically-operated brakes and such type brakes have been in use for a number of years. Typical illustrations of such brakes are contained in U.S. Pat. Nos. 3,134,463 and 3,244,259.

Recently there has been a movement reflected by S.A.E. and Government regulations to require a greater usage of brakes on towed vehicles, extending the requirement to vehicles of lower weight than previously required and requiring in some instances that all wheels of the towed vehicles be equipped with brakes. The latter requirement is in contrast to past practices in which, for example, mobile homes having a total of six or eight wheels would have brakes on only two or four of them. The result is that there has currently appeared a substantially increasing need for electrically equipped brake assemblies. This, of course, is in turn bringing about significantly increased costs of such vehicles, particularly since existing type electrical brakes have a good many components and are fairly expensive to manufacture.

In addition to the substantial costs of existing type electrical brakes, it has been found that in many instances their operation has been less than satisfactory. For example, it has been found that balanced loading of brake lining against brake drums is not often achieved, resulting in a deterioration in available braking force. This problem exists with mechanical, hydraulic, and air-operated drum brakes as well and, accordingly, the present invention is directed to drum-type brakes in general.

Another common problem has been that excessive forces are concentrated on certain components of the operating mechanisms causing deformation or failure of components, resulting in complete or nearly complete brake failure.

SUMMARY OF THE INVENTION

Accordingly, the object of the present invention is to provide a new and improved brake assembly which is less expensive to manufacture than previous brake assemblies and yet is of more reliable construction and will provide greater assurance of uniform braking action over the full anticipated life of the brake assembly.

In accordance with the invention, a wheel brake assembly is constructed for drum-type brakes in which the webs of brake shoes are supported between a pair of parallel spaced interconnected supporting plates, supporting surfaces for parallel planes, in turn supported by an axle or spindle.

BRIEF DESCRIPTION OF THE DRAWINGS

FIG. 1 is an exploded view of an electrical brake assembly as contemplated by the invention.

FIG. 1A is an exploded view of an alternate form of an electromagnet and mounting brackets.

FIG. 1B is a sectional view of an assembled electromagnet of the type shown in FIG. 1A.

FIG. 1C is a pictorial view of a splash plate usable with the electrical brake assembly shown in FIG. 1.

FIG. 2 is an elevational view of an assembled electrical brake.

FIG. 3 is a sectional view along lines 3—3 of FIG. 2.

DETAILED DESCRIPTION OF THE INVENTION

Figure 6:
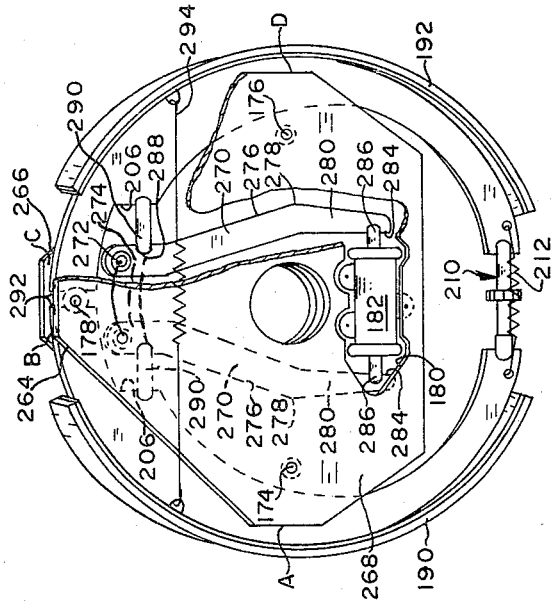
FIG. 6 is a pictorial view of a version of the invention wherein a double-acting hydraulic cylinder operates braking shoes through a pair of lever arms.

The non-rotating components of brake assembly 10 are shown opposite the parenthesis designated by the numeral 16 in FIG. 1. Triangular-shaped plates 18 and 20, referred to herein as "backing plates", are coupled together in a spaced relationship by spacer rivets 22, 24 and 26, having end regions 28 adapted to accept and extend through aligned apertures 30, 32 and 34, spaced inward of truncated corners of plates 18 and 20. Plates 18 and 20 are further connected by anchor pin 36, of larger diameter than spacer rivets 22, 24 and 26, having end regions 38 adapted to fit and extend through aligned bores 40, centrally formed near upper edge 42 of each of plates 18 and 20. Actuating lever arm 44 is pivotably supported by aperture 46 on upper rivet 24 between backing plates 18 and 20. It is of a thickness between 0.180 and 0.190 inches, is essentially eliptical in form and is provided with an intermediate elongated opening 48 which facilitates freedom of movement about spindle 50 to which plates 18 and 20 are to be welded. Aperture 46 is centrally positioned near upper end 52 of lever arm 44, being dimensioned to accept the enlarged diameter portion 54 of rivet 24. Rectangular shaped expansion lug 56 is disposed vertically above pivotal aperture 46 of lever arm 44 and is adapted to actuate brake shoes 58 and 60 in a manner to be further described.

A pair of inwardly disposed spaced fingers 62 are integrally formed normal to lower portion of lever arm 44 and are adapted to freely accept mating aperture 64 provided in electromagnet 66. Electromagnet 66 is urged into spring biased engagement with armature plate or disc 67 of hub and drum assembly 12, in a manner to be further described, by compression spring 69 retained about fingers 62, by retaining plug 63. Fingers 62 are pierced out of the surface of lever arm 44 and thus can be made in the same operation as aperture 46 and opening 48 when lever arm 44 is blanked progressively through the die from strip steel. When assembled, the three spacer rivets 22, 24 and 26, in addition to anchor pin 36, are inserted through apertures 30, 32, 34 and 40 respectively, and are firmly staked in one operation. In this fashion, an integral structure is formed with the plates spaced apart approximately 0.200 to 0.220 inches.

Upon assembly, support plates 18 and 20 are axially and radially aligned and securely welded to spindle 50 or axle tube 118 by welds 68 (FIG. 3) through mating semicircular mounting notches 70 centrally formed in lower portion 72 of plates 18 and 20.

Brake assembly 10 has two conventional brake shoes 58 and 60, each of which includes accurately-shaped table 74 and outer brake lining 76, and a centrally supported inner, generally upright, web 78.

Anchor pin end 80 of each of the webs 78 is provided with a semicircular notch 82 adapted to engage the central diameter portion 84 of anchor pin 36. A right angle notch 85 is vertically disposed below notch 82, being dimensioned to mate with actuating lug 56 of lever arm 44, previously described. Rectangular notch 86, centrally formed in lower end 88 of each web 78 is adapted to interengage with similarly dimensioned slot 90 formed in the ends 92 of conventional brake adjustment assembly 94.

When assembled, brake shoes 58 and 60 are substantially supported in a precise axial alignment by webs 78, being adapted to closely fit between backing plates 18 and 20 in regions "A", "B", "C", and "D" as shown in FIG. 2. Semicircular notches 82 in ends 80 of webs 78 are maintained in spring biased engagement on opposite sides of anchor pin 36 by a pair of like tension springs 96. Each of springs 96 is provided with hooked ends 98 which are engaged in notched holes 100 in webs 78 of brake shoes 58 and 60.

Brake shoes 58 and 60 coact at lower ends 88 through conventional brake adjustment assembly 94, being maintained in connecting engagement by tension spring 102 provided with hooked ends 104 whereby it is coupled between opposing holes 106 notched in webs 78. The rotating elements of brake assembly 10 consist of drum 108, drum back 110, armature plate 67 and hub 114. Drum 108 is supported for rotation about brake shoes 58 and 60 by drum back 110 which is conventionally attached or formed together with rotating hub 114. Armature 67 is a ferous, disc-shaped member and is either formed integral with a hub or is a separate disc which is typically attached by rivets 116 to drum back 110. It has a flat face oriented perpendicular to the axis of drum 108 and is axially positioned to normally rotate in low friction contact with electromagnet 66. Hub 114 is rotably supported in a conventional fashion on stub axle 50 by roller bearings and a securing means, not shown. Stub axle 50 in turn, is typically welded to the main axle 118 of the vehicle and extends between stub axles 50 on either side of the vehicle, being normally attached in a conventional fashion through suspension mounting pads 121.

Of particular significance is the fact that the invention enables the mounting of the brake assembly further outboard than possible with known design, that is, nearer the bearing journal on which hub and drum assembly 12, and wheel and tire assembly 14, are mounted. In fact, this distance has been reduced by more than one inch over current designs to enable this distance to be typically reduced from 3 11/16 to 2¼ inches. A range of 2 to 2½ inches for this dimension may be achieved with the design of the invention. The significance of this is illustrated in FIG. 3 wherein the downward force of the vehicle load on suspension pad 121 is supported by the opposite or upward force applied to spindle 50 by wheel and tire assembly 14 supported by ground 122. The result is that there is significantly less flexure of the axle assembly between the points of mounting of the brake assembly and the drum assembly and this assures much better alignment between the brake shoes and the brake drum and thus greater wear.

OPERATION OF ELECTRICAL BRAKE

Assume, initially, that drum 108, and the wheel 14 to which it is connected on a vehicle, is rotating in a counterclockwise direction representing forward motion of the vehicle. In order to apply braking force, power is applied to input leads 120 of electromagnet 66 through a switch normally located in the cab of a tractor towing the vehicle including brake assembly 10. A magnetic flux is then produced by electromagnet 66 which causes it to be attracted into a high friction contact with armature plate 67 and this in turn causes lever arm 44 to be rotated about rivet 24 a few degrees in a counterclockwise direction.

In this manner, actuating lug 56 of lever arm 44 is turned to apply a force upon engaging surface 85 at the top end of web 78 of (primary) shoe 58, causing shoe 58 to be moved radially outward into frictional engagement with inside diameter of drum 108. This in turn causes the bottom end 88 of web 78 of shoe 58, to apply a radial pushing force through brake adjustment assembly 94 to secondary shoe 60 and thus both brake shoes coact to apply a substantial braking outward radial force to brake drum 108 and thus to wheel 14 of the vehicle attached thereto. The result is, of course, that a braking force is transmitted through anchor pin 36, to backing plates 18 and 20 to axles 50 and 118 and then to the supported vehicle causing it to be brought to a halt. Thus this braking force is transmitted from brake shoes 58 and 60 to the axle 50 along a plane perpendicular to the axle 50 and which is normal to the surface of the shoes 58 and 60 and which also intersects the center line of same.

Assume next that a braking action is to be applied to a vehicle moving in the opposite direction wherein brake drum is initially turning in a clockwise direction. Lever arm 44 would then be pivoted in a clockwise direction by armature disc 67 to initially cause lug 56 to engage upper surface 85 of shoe 60 and cause shoe 60 to move into engagement with brake drum 108. This action in turn causes the lower end of brake shoe 60 to apply force to drum 108 which is transmitted to shoe 60 which coacts with shoe 58 to apply an increased braking effect, in like manner as described above, to again bring the vehicle to a halt.

An alternate electromagnetic assembly is shown in FIGS. 1A and 1B wherein a circular electromagnet 130 is provided with a rectilinear mounting slot 132 centrally formed in center pole piece 133 of magnet 130. Oppositely positioned retaining lugs 136 are formed in upper and lower lateral walls of slot 132 at a point midway between vertical walls 138 and 140 which extend inward from rear surface 142 of magnet 130. Retaining lugs 136 are of a width dimension so as to freely engage the inner edges of spaced mounting fingers 62 previously described. When assembled to fingers 62, magnet 130 is secured to fingers 62 by spring clip 143 typically formed of flat strap material. Spring clip 143 includes U-shaped member 144 which is adapted to frictionally engage over the lower end of brake actuating arm 44. Forward arm 146 of U member 144 is formed so as to mate with the lower surfaces of mounting fingers 62 and is provided with an elongated rectangular slot 148. Once assembled over brake actuating lever 44 as shown in FIG. 1B, electromagnet 130 is forcibly engaged over forward connecting member 150 of rectangular slot 148 and lower retainer lug 136 is slidably retained by slot 148 while an upper lug 136 is adapted to guide magnet 130 being engaged with the inner surfaces of fingers 62. Electromagnet 130 is held in loosely sliding contact with armature plate 67, FIG. 1, by tension spring 152 supported at one end by rear surface 142 of magnet 130 and at the opposite end by the forward surface of actuating lever 44.

As an added feature splash plate 154, shown in FIG. 1C, protects movable parts of brakes herein described from dirt, water, and other gritty material which is encountered by a vehicle to which they are attached. Splash plate 154 is typically formed of high-impact plastic and includes a central supporting section 156 having integrally formed ribs 158 and is provided with a central opening 160 adapted to mount to vehicle axle 118. An outer ring 162 formed in the shape of a circular trough is adapted to freely receive the inner edge of brake drum 108 (FIG. 1). Splash plate 154 is attached about vehicle axle 118 through radial slot 164 formed between the outer perimeter of splash plate 154 and central opening 160. It is supported to brake assembly 16 by a bracket (not shown) attached to backing plate 18 which is adapted to accept an inner trough-shaped mount 166 being firmly secured thereto by pins or bolts 168, or alternately, plate 154 may be clamped.

Figure 4:
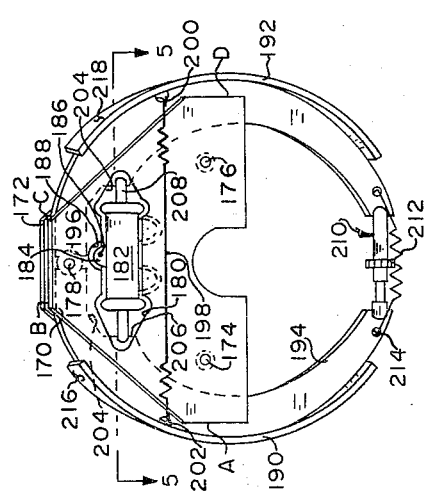
FIG. 4 is a pictorial view illustrative of a liquid or air-operated version of the present invention.

FIGS. 4-8 illustrate four alternate methods of activating the brakes by hydraulic means instead of by electromechanical means. In FIG. 4 twin plates 170 and 172 are appropriately spaced by spacer rivets 174 and 176 and anchor pin 178, as better illustrated in FIG. 3. Elongated cutouts 180 are formed in each of plates 170 and 172 which are adapted to receive a dual hydraulic cylinder 182. Cylinder 182 is supported by three mounting lugs 184, two of which are secured rearward of plate 170 by bolts 186 and the third upper lug 184 which is secured to rear plate 172 by bolt 186. In order to facilitate removal of hydraulic cylinder 182 a cutout 188 is made in forward plate 170 through which lug 184 is inserted, while rearward plate 172 is provided with similar cutouts through which lugs 184 are removably attached to forward plate 170. When assembled, brake shoes 190 and 192 are substantially supported in a precise axial alignment by webs 194, being adapted to closely fit between backing plates 170 and 172 in regions A, B, C and D. Semicircular notches 196 in the upper ends of webs 194 are maintained in spring biased engagement on opposite sides of anchor pin 178 by a pair of like tension springs 198. Each of springs 198 is provided with hooked ends 200 which are engaged in notched holes 202 formed in webs 194 of brake shoes 190 and 192. Elongated notches 204 are formed inward of the upper end of webs 194 which are provided with an inward facing end surface 206 adapted to engage shoe contacting pins 208 of dual wheel cylinder 182. Brake shoes 190 and 192 are innerconnected at their lower ends by brake adjustment assembly 210 and tension spring 212 which is provided with hooked ends whereby it is coupled between holes 214 notched in webs 194. The hydraulic brake assembly of FIG. 4 is typically supported to a spindle as by welds in a manner illustrated with respect to FIG. 3.

In order to apply a braking force, hydraulic pressure is applied to wheel cylinder 182 as by foot pedal operation of the master brake cylinder. This causes the pistons and thus shoe contacting pins 208 to move outward applying opposing forces to operating surfaces 206 of shoes 190 and 192. As a result shoe braking surfaces 216 and 218 are pressed against a brake drum in the same manner and with the same effect as described with respect to the electrical brake of FIG. 1. Thus this braking force is transmitted from brake shoes 190 and 192 to a spindle along a plane perpendicular to the spindle and which is normal to the surface of shoes 190 and 192 and which also intersects the center line of shoes 190 and 192 as previously described.

Figure 5:
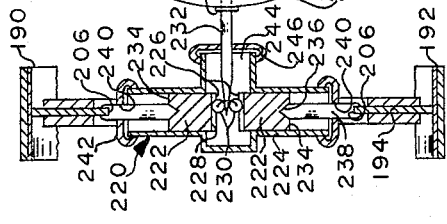
FIG. 5 is a sectional view along lines 5—5 of FIG. 4 and wherein the braking assembly is pneumatically operated.

FIG. 5 is a cross sectional view taken along the lines 5—5 of FIG. 4 and is illustrative of a dual acting pneumaticmechanical brake assembly 220 which when mounted in place of hydraulic cylinder 182 of FIG. 4 has the same outward appearance. Circular guides 222 are slidably retained within the outer end regions of cylinder 224, being provided on the inwardly facing ends 226 with a transverse slot 228 which is dimensioned to accept roller bearings 230. Wedge shaped actuating arm 232 is supported by the inwardly facing surfaces of roller bearings 230. Outwardly disposed ends 234 of circular guides 222 are provided with a conically shaped socket 236 which is adapted to freely receive a like dimensioned end of shoe contacting pins 238. The opposite ends of contacting pins 238 extend outward through openings 240 formed in pliable seals 242 which close the opposite ends of cylinder 224 to prevent contamination from collecting on the sliding surfaces of cylinder 224 and sliding guides 222. Brake contacting pins 238 are configured on the ends so as to accept slots, not shown, provided in end regions 206 of webs 194, as shown in FIG. 4. Actuating arm 232 extends outward through cylindrical access compartment 244, covered by suitable flexible dust cap 246 and thence through a protective dust cap 248 in the outer wall of pneumatic assembly 250. The inner end 252 of actuating pin 232 is centrally secured to flexible diaphragm 254. Diaphragm 254 is suitably supported within ovular housing 256 which is in turn supported by bracket 258 to a suitable non-rotating member such as a vehicle axle, not shown. Brake shoe 190 and 192 are held in firm engagement with anchor pin 178 (FIG. 4) by a pair of like tension springs 198, better shown in FIG. 4.

Pneumatic-mechanical actuating assembly 220 operates as follows. Assume initially that a vehicle to which backing plates 170 and 172 are attached is in motion and that the drum which surrounds brake shoes 190 and 192 is rotating. To apply a braking force, air pressure is selectively applied through inlet line 260 (or vacuum applied to compartment 263) from a valve, not shown, connected, for example, to a brake pedal, which pressurizes the rear compartment 262 of pneumatic assembly 250. Diaphragm 254 is moved toward the left which pushes actuating arm 232 into further engagement with roller bearings 230. Inclined surfaces of operating arm 232 cause bearings to be further separated and thus move slides 222 outward which action applies an expanding force through pins 238 to brake shoes 190 and 192 and thus a braking force, as previously described.

The dual acting wheel cylinder with respect to FIG. 4 also readily lends itself to the hydraulic mechanical assembly shown in FIG. 6. Backing plates 264 and 266 shown in FIG. 6 are also spaced to support brake shoes 190 and 192, in a manner previously described, by anchor pin 178 and strategically placed spacer rivets 174 an 176, as shown in FIG. 3. The assembly is also affixed to a spindle as by welding as described above with respect to FIG. 3. Each of plates 264 and 266 in the configuration shown in FIG. 6 is provided with a downward extending region 268 which has cutouts 180 adapted to receive hydraulic cylinder 182 as previously described. In this configuration a pair of similar levers 270 are pivotally attached at the upper end by suitable pivot pins 272 which are supported by backing plates 264 and 266. Each of levers 270 includes an upper vertically disposed portion 274 which joins a central interconnecting region 276, being formed outward so as to provide free clearance for an axle and which joins, at the lower end 278 a vertically disposed pin engaging portion 280. Notches, not shown, are cut into the inwardly facing edges 284 of levers 270 which are adapted to accept piston connecting pins 286 of hydraulic cylinder 182. Similar notches, cut in the outwardly facing edges of levers 270 at a point 288 intermediate the ends are adapted to interconnect with pins 290 which extend between levers 270 and operating end surfaces 206 of shoes 190 and 192. When assembled, and as described before, anchor pin ends 292 of webs 194 are held in firm contact with anchor pin 178 by brake retracting spring 294. The lower ends of shoes 190 and 192 are interconnected as before by brake adjusting assembly 210 and spring 212. When thus assembled, brake shoes 190 and 192 are supported within regions A, B, C, and D between backing plates 264 and 266, as previously described.

Hydraulic pressure is applied to wheel cylinder 182 in a manner described above resulting in an outward movement on contacting pins 286. Right lever 270 pivots in a counterclockwise direction which applies an outward force to surface 206 of right brake shoe 192. Contacting pin 286 of cylinder 182 applies a clockwise movement through left lever 270 and connecting pin 290 to operating surface 206 of brake shoe 190. Accordingly, each shoe 190 and 192 is moved into contacting engagement with a brake drum, not shown, to apply a braking force as described above. It is readily seen that much less hydraulic pressure is required to apply an equal force to brake shoes 190 and 192 in view of the mechanical amplification ratio provided through levers 270. This form of the brake is particularly enabled by virtue of the precise alignment of the brake shoes provided by the invention resulting in less necessary travel of the pistons of cylinder 182. This in turn enables cylinder 182 to be sufficiently compact to fit in the limited space in which it must be mounted.

Figure 7:
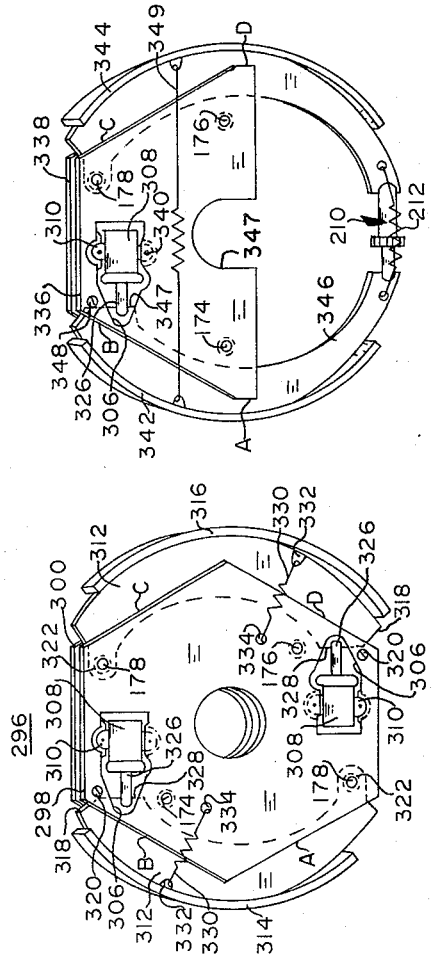
FIG. 7 is a pictorial view of a hydraulic version of the present invention wherein two single-acting hydraulic cylinders provide a force on front and back brake-shoes, respectively.

FIG. 7 shows how a dual cylinder hydraulic brake assembly 296 is supported by spaced backing plates 298 and 300. In this configuration, backing plates 298 and 300 are cut into a hexagonal shape whereupon they are then held in spaced relationship by spacer rivets 174 and 176 and anchor pins 178 (better shown in FIG. 3). Each of plates 298 and 300 have oppositely positioned cutouts 306 which are dimensioned to accept a single hydraulic cylinder 308 which is removably attached by suitable lugs 310 to rear backing plate 300 and forward backing plate 298. When assembled, webs 312 of brake shoes 314 and 316 are supported between backing plates 298 and 300 in regions A, B, C, and D, as before described. One end 318 of each of webs 312 rests against adjusting cam 320 which is adapted to maintain brake shoes 314 and 316 in close proximity to a drum, not shown. The opposite end 322 of each of shoes 314 and 316 is supported by anchor pin 178 as shown in FIG. 1 which extends through a hole, not shown, provided in end region 322 of webs 312. Shoe contacting pins 326 of each of wheel cylinders 308 has an outer end configured to accept a slot provided in free end region 328 of each of webs 312. Each of shoes 314 and 316 is held in a retracted position by a pair of like tension springs 330 located on each side of backing plates 298 and 300 and which are supported by holes 332 in webs 312 and holes 334 provided in backing plates 298 and 300. In operation, equal hydraulic pressure from a master cylinder such as that previously described, being operated by a foot pedal, is applied outward force to ends 328 of brake shoes 314 and 316, forcing them outward radially into contact with a drum. Assuming that a brake drum, not shown, is rotating in a counterclockwise direction about shoes 314 and 316 as viewed in FIG. 7, a substantial braking force would be applied to the inner surface of the drum.

Figure 8:
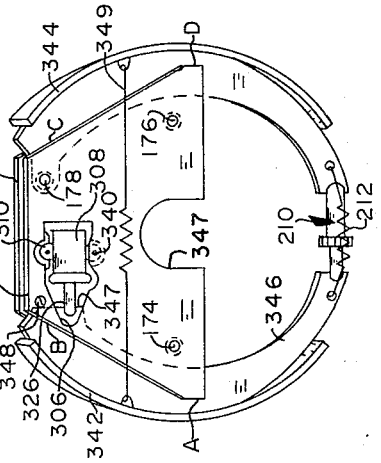
FIG. 8 is a pictorial view of a hydraulic brake version of the present invention wherein a single acting hydraulic cylinder provides an operating force.

An alternate hydraulic brake assembly is shown in FIG. 8 in which traingular shaped backing plates 336 and 338 are spaced by spacer rivets 174 and 176 and anchor pin 178, as previously described, and each have cutout 306 which is adapted to mount a single wheel cylinder 308. Wheel cylinder 308 is supported by mounting lugs 310 to rear backing plate 338 and forward backing plate 336, respectively, by bolts 340. When assembled, as shown in FIG. 8, brake shoes 342 and 344 are supported in precise axial alignment by webs 346 which are adapted to closely fit between backing plates 336 and 338 in regions A, B, C and D as previously described. The lower ends of brake shoes 342 and 344 are interconnected by conventional brake adjust assembly 210 and spring 212. The upper end of brake shoe 344 is pivotally supported by anchor pin 178, configured as shown in FIG. 1. The upper end of brake shoe 342 has vertically disposed end surface 347 which is held in contacting engagement with adjustment cam 348 by brake shoe retracting spring 349. Brake shoe contacting pin 326 of wheel cylinder 308 is in contacting engagement with a slot, not shown, provided in end region 347. Once assembled, the brake is attached to a spindle by welds as shown in FIG. 3. Accordingly, brake shoes 342 and 344 are supported in exact axial alignment. In operation, hydraulic fluid under pressure is fed from a master cylinder, not shown, to wheel cylinder 308 which forces contacting pin 326 outward. This moves brake shoe 342 into contacting engagement with a drum. Brake shoe 342 then acts through adjustment assembly 210 to force the lower end of brake shoe 344 into contacting engagement with inner surface of the brake drum and a braking force applied as previously described.

Figure 9:
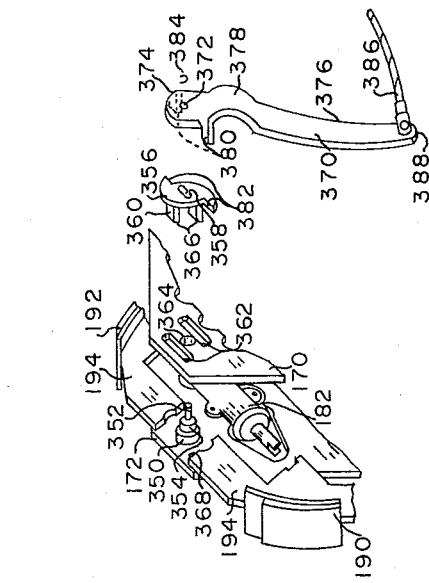
FIG. 9 is an exploded pictorial view of a brake assembly similar to that illustrated in FIG. 4 except that there is additionally provided means for mechanically operating the brake assembly.

FIG. 9 is a top view in perspective of a portion of the brake shown in FIG. 4. It illustrates how a parking or emergency brake lever is attached to a vehicle equipped with brake assemblies which employ backing plates 170 and 172. Anchor pin 350 includes a lever support shaft 352 which extends beyond shoulder portion 354 by which anchor pin 350 is secured to backing plate 170. S-shaped brake actuating cam 356 includes centrally formed slot 358 which is adapted to freely slide over shaft 352 and has inwardly formed tines or prongs 360 which are dimensioned to freely accept slots 362 formed above and below hole 364 formed in backing plate 170. Once assembled, the inner end regions 366 of prongs 360 are adapted to engage end surfaces 368 of webs 194. Lever arm 370 is pivotally attached over shaft 352 through hole 372 centrally formed in upper circular regions 374 of arm 370. Lower portion 376 of actuating lever arm 370 is formed in an arc so as to clear a vehicle axle and is joined to upper curved region 374 by U-shaped member 378 which is adapted to clear wheel cylinder 182. Oppositely positioned tines or prongs 380 are integrally formed about upper end region 374 of lever arm 370 and are adapted to engage mating surfaces 382 of brake shoe actuating cam 356. Lever arm 370 is in turn rotably supported to shaft portion 352 by locking ring 384. Lever arm 370 is actuated by cable 386 attached at its lower end 388. When cable 386 is thus tensioned, brake actuating lever 370 is rotated in a counterclockwise direction and cam 356 rotated counterclockwise, applying an outward force through prongs 360 of cam 356 to upper end 368 of brake shoes 190 and 192. Brake shoes 190 and 192 are then expanded outward into engagement with a brake drum to apply a substantial parking brake force to the drum.

Figure 10:
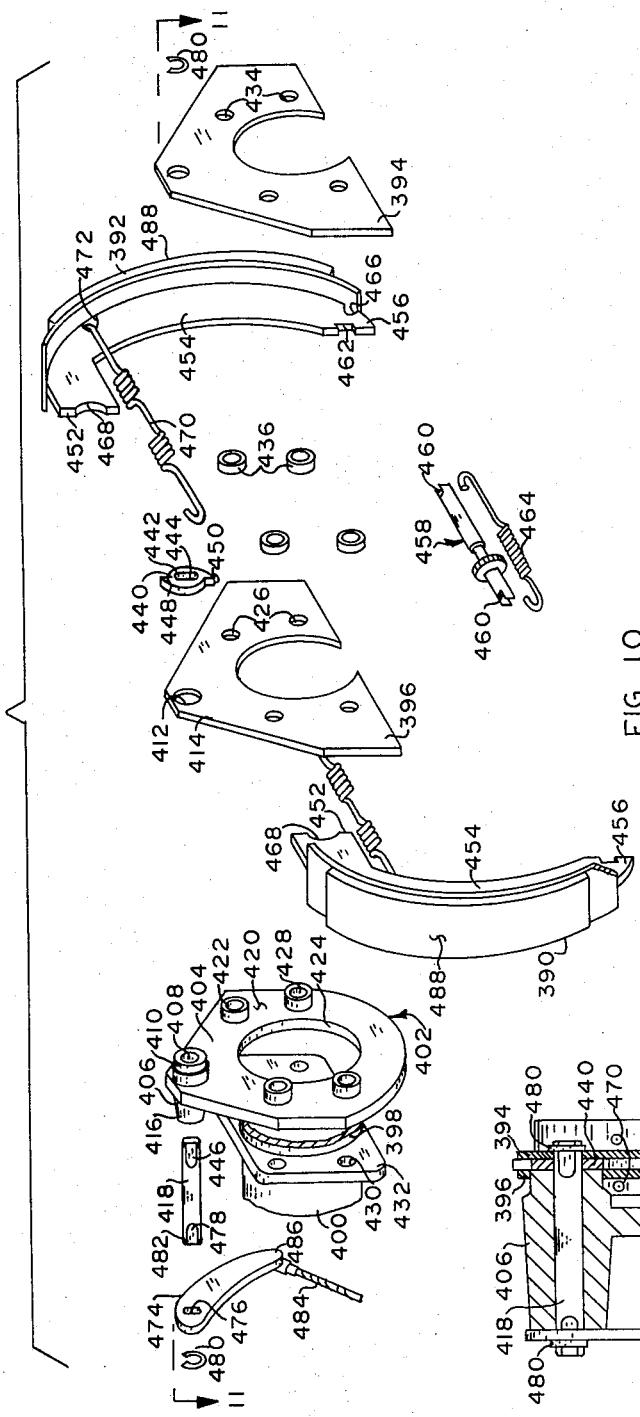
FIG. 10 is an exploded pictorial view of an embodiment of the invention wherein braking force is applied solely by mechanical means.
Figure 11:
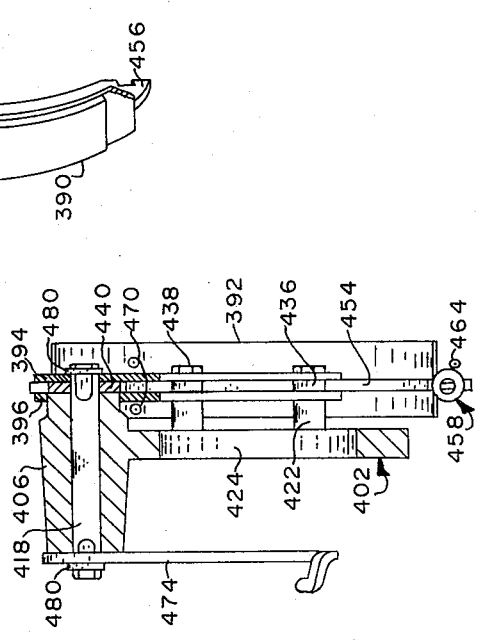
FIG. 11 is a sectional view along lines 11—11 of FIG. 10.

Referring to FIGS. 10 and 11, there is shown one embodiment of the invention in which brake shoes 390 and 392 are mechanically expanded or operated and in which backing plates 394 and 396 are detachably supported by axle member 398, also removably attached to conventional mounting flange of vehicle axle 400. Mounting flange 402 is essentially circular in form, having an upwardly disposed triangular section 404 which is adapted to mount tubular bearing 406, having a centrally formed longitudinal bearing surface 408. Bearing 406 extends forward of mounting flange 402 and is provided with an outward shoulder region 410, which is adapted to accept a similarly dimensioned hole 412 formed in upper edge region 414 of backing plate 396. Bearing 406 has an elongated rear portion 416 which provides a substantial bearing surface for actuating shaft 418. Backing plate 396, when assembled, is held in spaced relationship with respect to forward surface 420 of mounting flange 402 by forwardly projecting standoffs 422, spaced about central opening 424 in order to appropriately position backing plates 394 and 396 with respect to mounting flange 402. Backing plate 396 is attached to mounting flange 402 through mounting holes 426 which are dimensioned to mate with holes 428 centrally formed in standoffs 422, which in turn mate with holes 430 provided in flange 432 attached to axle 400. Forward backing plate 394 is provided with similarly dimensioned holes 434 and is attached in spaced relationship to backing plate 396 by spacers 436, the entire assembly being attached by bolts 438 (FIG. 11) through holes 430 to mounting flange 432. Brake-operating cam 440 has a circular inner body 442 through which is formed an oval slot 444 adapted to accept a similarly configured end region 446 of brake actuating shaft 418. Diametrically positioned risers 448 of cam 440 have shoe-engaging surfaces 450, rounded as shown in FIG. 10, to provide low frictional engagement between surfaces 450 and end surfaces 452 of webs 454 of brake shoes 390 and 392. When assembled to actuating shafts 418 (FIG. 11), actuating cam 440 is axially supported between the forward surface of bearing 406 and forward plate 394. Brake shoes 390 an 392 are connected at lower ends 456 of webs 454 by conventional brake adjust assembly 458, having a slot 460 at each end, which is adapted to accept similarly dimensioned notches 462 cut in ends 456 of webs 454, and by spring 464, having hooked ends, which are engaged in holes 466 formed in webs 454. Circular notches 468 are formed in end regions 452 of webs 454 which are dimensioned to closely engage central circular portion 442 of brake actuating cam 440. When in an unoperated or retracted position, notches 468 of webs 454 are held in spring-biased engagement with operating cam 440 by like tension springs 470. Springs 470 are positioned on opposite sides of backing plates 394 and 396, and have hooked ends supported within holes 472 formed in webs 454. A braking force is applied to brake shoes 390 and 392 through actuating shaft 418 by elongated lever arm 474, having a circular upper end through which is formed an oval notch 476 dimensioned to accept a similarly dimensioned end region 478 of actuating shaft 418. When assembled, as shown in FIG. 11, actuating shaft 418 is axially supported by locking rings 480 secured within slots 482 formed inward of the ends of actuating shaft 418. Lever arm 474 is formed in an arc so as to clear an axle of a vehicle and is actuated by brake cable 484 attached to lower end 486 of arm 474, being typically routed underneath the axle.

It is readily seen that brake shoes 390 and 392 are substantially supported by backing plates 394 and 396 and are thus maintained in a precise axial alignment about axle 400. In operation, cable 484 is tensioned by a brake lever located in a vehicle. This applies a clockwise force to lever arm 474. Rounded surfaces 450 of actuating cam 440 are thus brought into contacting engagement with ends 452 of webs 454. This forces the outer surface 488 of shoes 390 and 392 into contact with a cooperating brake drum, not shown. Because of the large operating cam 440 and contoured leading edges 450 of cam 440, an improved, dependable, and even braking force is applied to shoes 390 and 392. The brake assembly just described is particularly useful as a service brake or emergency brake in addition to serving as a desirable parking brake.

Figures 12, 13:
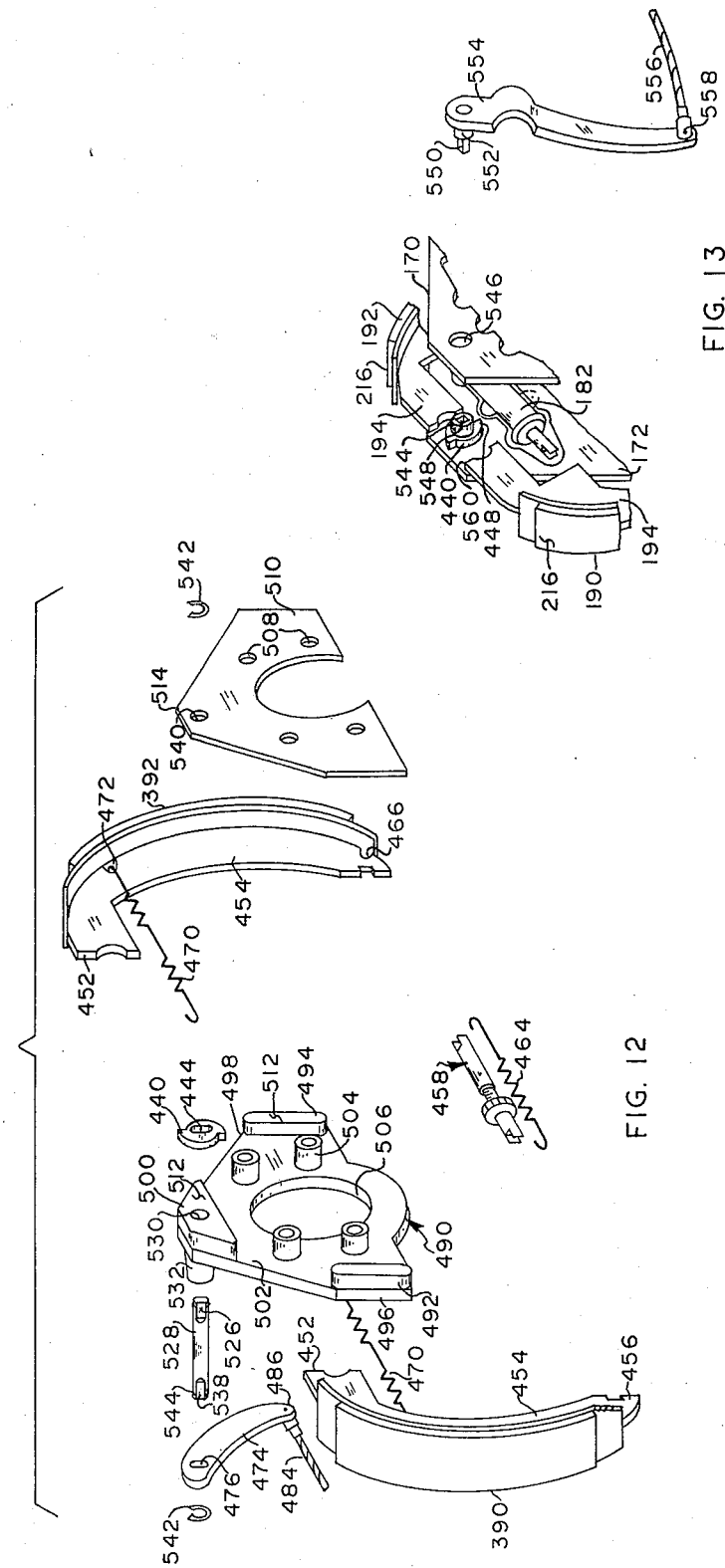
FIG. 12 is an exploded pictorial view of an alternate form of mechanical brake.
FIG. 13 is an exploded view of an alternate assembly, to that shown in FIG. 9, for adding a mechanical braking mechanism to a hydraulic brake.

Referring to FIG. 12, there is shown a modified version of the mechanical brake assembly shown in FIG. 10 wherein one backing plate as a discrete element has been eliminated. Instead of one of the plates, mounting bracket 490 has elongated embossed or raised plate regions 492 and 494 formed at opposite sides 496 and 498 of bracket 490. A triangular-shaped embossment or raised plate region 500 is formed along vertically disposed end region 502 of bracket 490, all regions being of equal thickness dimension with respect to the forward surface of bracket 490. Four tubular standoffs 504 are spaced about inner circular cutout 506 having inner dimensions identical to and in alignment with holes 508 formed in backing plate 510. Standoffs 504 are of a greater thickness than the plate regions and are adapted to support backing plate 510 when assembled thereto so as to provide spaced regions between surfaces 512 of embossments 492 and 494 and 500 and surface 514 of backing plate 510. There is thus provided spaced plate surfaces which form a guide to support webs 454 of brake shoes 390 and 392 in a precise alignment. Brake actuating cam 440, which is formed identical to that described above, is provided with a centrally formed oval slot 444 which is dimensioned to receive a like dimensioned end 526 of cam actuating shaft 528. Cam actuating shaft 528 is supported by a bearing 530 formed through embossment 500 and tubular elongated support 532 which extends beyond the rear surface of mounting bracket 490. Actuating lever 474, similar to the one described immediately above, has an oval slot 476 formed in an upper circular region adapted to accept like dimensioned end region 544 formed on actuating shaft 528. Once assembled, actuating shaft 528 is inserted through bearing 530, actuating cam 440, and upper opening 540 of backing plate 510. Actuating lever 474 is assembled to the opposite end of actuating shaft 528, and the shaft is axially retained by locking rings 542 which are dimensioned to fit within circular slot 544 formed near each end of actuating shaft 528. Brake actuating lever 474 is curved so as to provide clearance between lever 474 and a vehicle axle and has brake cable 484 attached near lower end 486. Brake shoes 390 and 392, when mounted, are interconnected at the lower end 456 by conventional brake adjustment assembly 458 and by tension spring 464 having hooked ends adapted to engage holes 466 provided in webs 454 of shoes 390 and 392. The upper anchor pin ends 452 of webs 454 are held in the same biased engagement with actuating cam 440 by a pair of like tension springs 470, supported at the ends by holes 472 formed in webs 454, being disposed outside of backing plate 510 and bracket 490. Operation of this brake assembly is identical to that described immediately above, shown in FIGS. 10 and 11.

FIG. 13 is a fragmented view of a portion of a hydraulic brake assembly shown in FIG. 4 as viewed from the top. FIG. 13 shows how a parking or service brake is selectively added to the hydraulic brake.

Brake actuating cam 440, similar to that described above with respect to FIGS. 10-12, is supported by a combination brake actuating shaft and anchor pin 544 which is supported on each end by aligned holes 546 formed near the upper end of backing plates 170 and 172. A square socket 548 is formed into the end of actuating shaft 544 which is adapted to accept a similarly dimensioned insert 550 formed on the connecting end region of lever mounting shaft 552. Shaft 552 is attached to an upper end region of parking brake actuating lever 554. Lever 554 is operated by brake cable 556 which is attached through pin 558 at the lower end of brake lever 554. Lever 554 is appropriately curved, as shown, to clear wheel cylinder 182 and an axle of a vehicle. When brake cable 556 is tensioned as by a conveniently located lever within a vehicle, lever 554 is moved in a counterclockwise direction and risers 448 of operating cam 440 force inwardly disposed ends 560 of webs 194 outward, applying a braking force through surfaces 216 of brake shoes 190 and 192 to a brake drum.

SUMMARY OF FEATURES

It will be readily seen from the drawings and the foregoing description that the braking system disclosed herein meets the objectives set forth for it. Backing plates and lever arms can be simply formed by stamping them out of strip coil metal plate. While not shown, guide holes may be provided in the backing plates to facilitate location during welding on axle or spindle. Further, where additional stiffening or flatness is desired, ribs may be formed outwardly into the back of each backing plate.

The remaining components, other than backing plates and lever arm, in general, are readily available at relatively low cost. The total number of components is a reduction over that required for many brake assemblies of other designs.

As a particular structural feature, FIG. 1, lever arm 44 is supported in a balanced fashion by rivet 24 between plates 18 and 20. By being thus mounted upon a pivoting support which has dual supports or in double shear and therefore there is provided substantially greater support than typically found, wherein the lever pivot is singly supported at one end and in single shear and subject to lever action. This means that not only is there much less chance that the lever pivot will break but much less chance, in fact slight if any, that it or the support area will deform and thus produce a malfunction of the lever arm operating the brake shoes because of the balanced center line of loads and actions. The same added support is provided anchor pin 36 wherein it and its dual supporting structure, plates 18 and 20, provide a more rugged and durable and easily assembled structure.

Since plates 18 and 20 provide a guide during planer operation of lever arm 44, it is assured that lug 56 on lever arm 44 will provide a desired direction of force on shoes 58 and 60 which is normal to bands 74 and linings 76 of brake shoes 58 and 60.

The backing plates or guide plates of all embodiments provide a guide in which the webs of brake shoes operate and thus there is prevented the tendency of the brake shoes to apply an uneven engaging surface to the working surface of a brake drum and the shoes maintained as aligned and in position when not engaged. Therefore adjustment of lining clearance to a drum inside diameter can be minimized and travel to full engagement lessened. Thereby improvement of field life is offered without repeated adjustments. Maintaining shoe alignment heretofore has been a substantial problem, wherein the brake shoes are both supported from a single side of a single plate, which plate deflects with each brake application and is not infrequently distored because of heat and forces from the brakes being transmitted to the plate. In some instances, small distortions and stresses arise from the manufacturing process which are then amplified by heat generated by usage. In the case of the present invention, employing dual plates, and wherein the brake shoes are oriented in a balanced fashion, on a given centerline of forces and reactions such heating does not tend to produce distortions which have such an effect. For one thing, with the dual plates, there is greater ventilation offered and the conductivity of the heat away from the brakes to the axle and for another, the cross-support provided between them provide substantial resistance to deformation of the plates.

As still another advantage of the present invention, it enables the shoes to be aligned in use in the same manner in which they are aligned in the final stage of manufacture, that is during the grinding of the lining to the prescribed tolerances. Thus, in this grinding procedure, the webs of the shoes are normally used as a reference plane, the webs being gripped by the grinding fixture. Similarly in the present brake assembly, the webs are used as the alignment reference since the webs fit between backing plates in an aligned position. In contrast, prior braking systems have not used the webs as reference alignment means, instead they have used edges of the table of the brake shoe assemblies. The result has been that not infrequently, misaligned brake assemblies are produced, requiring additional grinding of the linings in order that the brake shoes will fit inside of the brake drums with which they ae to be used.

Further improvement set forth herein is in the inclusion of a balanced system for return of the brake shoes to a non-engaged posture after they have been operated. This is provided by the dual set of return springs 470, FIG. 10.

The overall result is that the present invention clearly provides a new braking system with improved performance and accomplishes this generally at a lower cost of manufacture.

What is claimed is:

1. The method of construction of a wheel brake assembly comprising:

stamping from a flat sheet material a single pair of generally delta-shaped flat plates and forming a semi-circular opening in one side edge of each plate, said side edge opening being generally opposite to an apex region of said plate;

with said flat plates spaced and parallel and aligned with said openings adjacent, installing a single anchor pin between plates near one corner region in a position opposite said openings, and installing between said plates means for selectively applying a force parallel to the side edge containing said openings;

rigidly fastening the thus formed flat plates in a fully spaced and parallel relation together, leaving a clearance for webs of brake shoes sufficient for movement of the webs but guided movement by and between said plates;

installing brake shoes with webs extending into and between opposite sides of said plates, and the webs of each being in engagement with said anchor pin;

installing a pair of springs on opposite sides of said plates and facing each other in a direction which is generally normal to a line extending between said anchor pin and the center of said semi-circular opening;

installing operating means reactively mounted on said plates for applying a force to the webs of said brake shoes; and positioning said openings in said plates over an axle member having a like curvature to that of said openings and welding both said plates to said axle member.

2. The method of construction of a brake assembly as set forth in claim 1 wherein there is installed a said means for applying a force parallel to the side edges containing said openings, comprising a lever rotably attached to and between said plates and between said webs, and including an electromagnet extending from one end of said lever, and an opposite end of said lever being adapted to apply a force to an end region of webs of brake shoes positioned between said plates.

* * * * *